United States Patent
Tochihara et al.

(10) Patent No.: US 6,619,791 B2
(45) Date of Patent: Sep. 16, 2003

(54) AQUEOUS INK, ORGANIC PIGMENT POWDER, INK CARTRIDGE, RECORDING UNIT AND INK-JET RECORDING APPARATUS

(75) Inventors: Shinichi Tochihara, Kanagawa (JP); Shoji Koike, Kanagawa (JP); Masaaki Hiro, Kanagawa (JP); Koromo Shirota, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/053,905

(22) Filed: Jan. 24, 2002

(65) Prior Publication Data

US 2002/0101490 A1 Aug. 1, 2002

(30) Foreign Application Priority Data

Jan. 26, 2001 (JP) .......................................... 2001/018434

(51) Int. Cl.⁷ .............................. B41J 2/01; C09D 11/00
(52) U.S. Cl. ......................... 347/100; 347/95; 106/31.6
(58) Field of Search ........................... 347/100, 96, 106, 347/98, 95, 84; 106/31.6, 31.13, 31.58; 523/160

(56) References Cited

U.S. PATENT DOCUMENTS

| 4,107,133 A | * | 8/1978 | Sawai et al. ................ 106/413 |
| 4,818,614 A | * | 4/1989 | Fukui et al. ................ 428/403 |
| 5,030,669 A | | 7/1991 | Hendrickson et al. ...... 523/333 |
| 5,106,533 A | | 4/1992 | Hendrickson et al. ...... 252/314 |
| 5,993,524 A | * | 11/1999 | Nagai et al. ................ 347/100 |
| 6,153,001 A | * | 11/2000 | Suzuki et al. ............ 106/31.65 |
| 6,083,315 A1 | | 7/2002 | Nakamura et al. .......... 106/410 |

FOREIGN PATENT DOCUMENTS

| EP | 0 960 914 A1 | 12/1999 |
| JP | 11-49974 A | 2/1999 |
| JP | 11-57458 A | 3/1999 |
| JP | 11-333288 A | 12/1999 |

OTHER PUBLICATIONS

T. Ihara et al. "Utilization of Cold Oxygen Plasma Treatment", Coloring Materials, 54: 531–536 (1981).
K. Tsutsui et al. "Plasma Surface Treatment of an Organic Pigment", J. Coat. Technol., 60 (765): 107–112 (1988).

\* cited by examiner

Primary Examiner—Raquel Yvette Gordon
Assistant Examiner—Manish Shah
(74) Attorney, Agent, or Firm—Fitzpatrick, Cella, Harper & Scinto

(57) ABSTRACT

Aqueous pigment ink and organic pigment powder are used for ink-jet recording to form high quality images. Organic pigment powder is prepared by finely granulating an organic pigment containing anthraquinone as principal ingredient by means of a vapor phase method to such an extent that the produced powder shows a number average particle diameter of primary particles of 10 to 50 nm. An aqueous ink contains such organic pigment powder.

17 Claims, 3 Drawing Sheets

AQUEOUS INK, ORGANIC PIGMENT POWDER, INK CARTRIDGE, RECORDING UNIT AND INK-JET RECORDING APPARATUS

BACKGROUND OF THE INVENTION

1. Field of the Invention

This invention relates to an aqueous ink, an organic pigment powder, an ink cartridge, a recording unit and an ink-jet recording apparatus.

2. Related Background Art

While dyes are mainly used as coloring materials of inks for ink-jet recording, massive research efforts have been made for developing inks using pigments as coloring materials because images formed by dye inks are not highly water resistant nor light resistant. Particularly, in recent years, ink-jet recording apparatus adapted to use inks containing color pigments have been marketed as so-called wide format printers to be used for various industrial applications including printing posters, panels, signs and pop advertisements. The recent technological development in the field of manufacturing pigment ink has triggered various technological proposals for methods of dispersing pigments that are good for ink-jet recording in aqueous solvents as well as methods of manufacturing such pigments.

As a result, problems concerning pigment ink for ink-jet recording including clogged nozzles of ink-jet recording heads and lack of long term storage stability have been alleviated if compared with the initial stages of development.

On the other hand, the color developing effect of ink for images printed by ink-jet recording has been steadily improved as a result of the development in recent years of optimal ink receiving layers arranged in recording mediums that has been made concurrently with the development of pigment ink, although such recording mediums are exclusively designed for particular types of ink-jet recording apparatus.

Additionally, inks containing pigment particles which are finely divided or have hydrophilic properties in order to stably disperse such pigment particles have been proposed in an effort for improving the quality of images formed by ink-jet printing using pigment ink. Japanese Patent Application Laid-open No. 11-49974 discloses a granular organic pigment showing an improved dispersibility obtained by introducing sulfonic acid group in a liquid phase and aqueous ink containing such a granular pigment. Japanese Patent Application Laid-open No. 11-57458 and Japanese Patent Application Laid-open No. 11-333288 disclose a method of manufacturing ultra-fine particles of an organic pigment by using a vapor-phase method and reforming the surface of the particles by means of a plasma treatment.

SUMMARY OF THE INVENTION

As a result of research efforts, the inventors of the present invention found that an organic pigment containing anthraquinone as main ingredient is suitably micro-granulated by means of a vapor-phase method to form ultra-fine organic pigment powder and that highly stable aqueous ink can be obtained by using such an organic pigment powder.

It is an object of the present invention to provide aqueous pigment ink that can be used to form high quality images.

Another object of the present invention is to provide very fine organic pigment powder that is excellent in terms of color tone and stability.

Still another object of the present invention is to provide an ink-jet recording apparatus that forms high quality images as well as an ink cartridge and a recording unit.

According to the invention, the above object is achieved by providing an aqueous ink comprising an organic pigment micro-granulated by means of a vapor phase method, the pigment containing anthraquinone as principal ingredient, wherein the organic pigment has a number average particle diameter of primary particles of 10 to 50 nm.

In another aspect of the invention, there is provided organic pigment powder containing anthraquinone as principal ingredient, the powder being micro-granulated by means of a vapor phase method, wherein the organic pigment powder has a number average particle diameter of primary particles of 10 to 50 nm and has a hydrophilic group introduced by means of a plasma treatment.

In still another aspect of the invention, there is provided an ink cartridge containing an aqueous ink according to the invention.

In still another object of the invention, there is provided a recording unit comprising:

an ink container containing an aqueous ink for ink-jet operation, the ink comprising an organic pigment micro-granulated by means of a vapor phase method, the organic pigment containing anthraquinone as principal ingredient, wherein the organic pigment has a number average particle diameter of primary particles of 10 to 50 nm; and an ink-jet recording head for ejecting ink from the ink container.

In a further aspect of the invention, there is provided an ink-jet recording apparatus comprising:

an ink container containing an aqueous ink for ink-jet operation, the ink comprising an organic pigment micro-granulated by means of a vapor phase method, the organic pigment containing anthraquinone as principal ingredient, wherein the organic pigment has a number average particle diameter of primary particles of 10 to 50 nm; and an ink-jet recording head for ejecting ink from the ink container.

Thus, according to the present invention, there is provided pigment ink containing very fine organic pigment powder and adapted to form images with an enhanced level of transparency comparable to images formed by dye ink. According to the invention, there is also provided very fine organic pigment powder that can be dispersed stably in an aqueous medium. While the reason why an organic pigment containing anthraquinone as principal ingredient can be micro-granulated by means of a vapor phase method without damaging its color tone is not known, the inventors of the present invention presume that, while azo-type pigments are apt to be decomposed in the course of micro-granulation by means of a vapor phase method, anthraquinone-type organic pigments are not because they are highly thermally stable. As a side effect of micro-granulation of an organic pigment by means of a vapor phase method, the content of polyvalent metal ions and that of silicon atoms in the pigment can be reduced from those of the pigment before micro-granulation. While these elements contained in the ink may not adversely influence the performance of the ink and may rather be effective for ink-jet recording operations, the polyvalent metal ions and the silicon atoms contained in a pigment are impurities mainly introduced during the pigment manufacturing process and their contents may vary from lot to lot so that the concentration of these elements preferably may well be minimized. According to the invention, the concentration of these impurities can be reduced to effectively improve the uniformity of ink quality.

DESCRIPTION OF THE PREFERRED EMBODIMENTS

Figure 1:
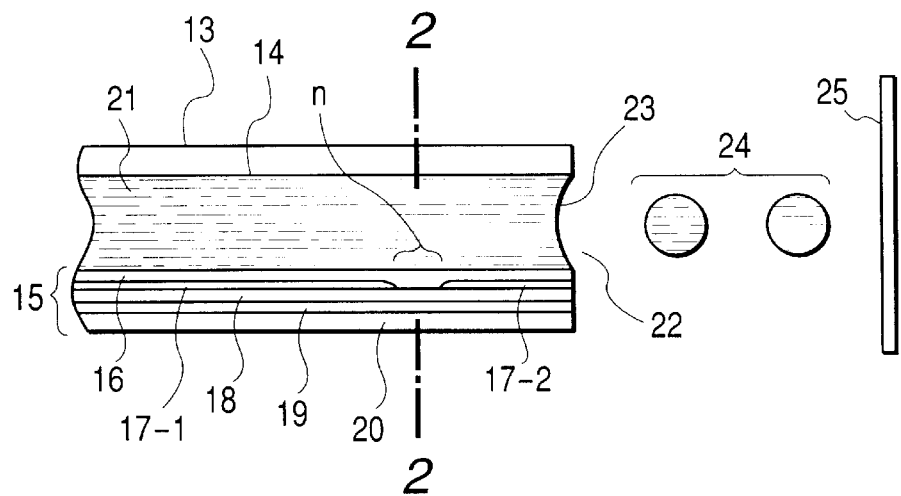
FIG. 1 is a schematic cross sectional view of a recording head adapted to an ink-jet recording method to be used for the purpose of the present invention.

Firstly, an organic pigment to be used for the invention contains anthraquinone as principal ingredient and is finely granulated by means of a vapor phase method including evaporating the pigment in inert gas. More specifically, with a vapor phase method, the organic pigment as raw material is heated to evaporate in a vacuum and the evaporated organic pigment is made to pass through inert gas. As molecules of the evaporated organic pigment continuously collide with inert gas molecules, the former are cooled and aggregated to produce fine particles of the organic pigment. With this method, organic pigment powder of ultra fine particles, primary particles of which are uniform and have a number average particle diameter of 10 to 50 nm, is produced. The obtained organic pigment powder contains polyvalent metals and silicon only to a small extent and the overall concentration of such elements can be held to less than 20 ppm.

Preferably, the number average particle diameter of primary particles of organic pigment is between 10 and 50 nm. Then, in aqueous ink according to the invention containing an organic pigment in a dispersed state, the content ratio of pigment particles showing a volume average particle diameter of 20 to 70 nm and a particle diameter distribution range from 10 to 300 nm can be significantly increased so that it is possible to obtain images where the pigment shows coloring effect and transparency to a desirable level. More preferably, the number average particle diameter of primary particles of the organic pigment powder according to the invention is between 20 and 50 nm.

For the purpose of micro-granulation of an organic pigment by means of a vapor-phase method, it is preferable that the organic pigment as raw material is structurally resistive against the heating temperature necessary for evaporating the organic pigment. From this point of view, a pigment having an anthraquinone type structure is used for the purpose of the invention because such a pigment is thermally more resistant than a pigment having an azo-type structure.

For the purpose of the invention, any pigments having an anthraquinone type structure may be used. Examples of such pigments include C.I. Pigment Blue 21, 60, C.I. Pigment Yellow 23, 24, 99, 108, 123, 147, 199, C.I. Pigment Red, 83, 123, 168, 177, 179, 190, 194, C.I. Pigment Violet 5:1, 29, C.I. Pigment Brown 26, and C.I. Pigment Orange 43, of which C.I. Pigment Yellow 23, 108, 147, and 199 are particularly preferable for the purpose of the present invention.

Preparation of Ink

First Mode

Ink can be prepared by dispersing organic pigment powder according to the invention obtained in a manner as described above in an aqueous medium, using a polymer dispersant and/or a surfactant as in the case of ordinary pigments. The obtained ink can be used for ink-jet applications. For the purpose of the invention, any ordinary water-soluble resin or water-soluble surfactant may be used as a dispersant for dispersing organic pigment powder according to the invention. Specific examples of water-soluble resin that can be used for the purpose of the invention include block copolymers or random copolymers of at least two monomers selected from styrene, styrene derivatives, vinyl naphthalene derivatives, aliphatic alcohol esters of α, β-ethylenic unsaturated carboxylic acids or the like, acrylic acid, acrylic acid derivatives, maleic acid, maleic acid derivatives, itaconic acid, itaconic acid derivatives, fumaric acid and fumaric acid derivatives, as well as salts of those copolymers. Such water-soluble resin is an alkali-soluble resin that can be dissolved in an aqueous solution of a base. Particularly, such water-soluble resin having a weight average molecular weight of 3,000 to 20,000 is preferable because such resin can facilitate the formation of a dispersion and also reduce the viscosity of the dispersion when used for ink for ink-jet applications.

Specific examples of water-soluble surfactant that can be used as a dispersant for the purpose of the present invention include the following. Examples of anionic surfactant include salts of higher fatty acids, alkylsulfates, alkylethersulfates, alkylestersulfates, alkylarylethersulfates, alkylsulfonates, sulfosuccinates, alkylaryl- or alkylnaphthalenesulfonates, alkylphosphates, polyoxyethylene alkyletherphosphates and alkylaryletherphosphates. Examples of cationic surfactant include alkylamine salts, dialkylamine salts, tetraalkylammonium salts, benzalkonium salts, alkylpyridinium salts and imidazolinium salts. Examples of amphoteric surfactants include dimethylalkyllaurylbetaines, alkylglycines, alkyldi (aminoethyl)glycines and imidazoliniumbetaines. Examples of nonionic surfactant include polyoxyethylene alkyl ethers, polyoxyethylene alkyl aryl ethers, polyoxyethylene polyoxypropylene glycols, glycerol esters, sorbitan esters, sucrose esters, polyoxyethylene ethers of glycerol esters, polyoxyethylene ethers of sorbitan esters, polyoxyethylene ethers of sorbitol esters, fatty acid alkanol amides, polyoxyethlene fatty acid amides, amine oxides and polyoxyethylene alkylamines.

Second Mode

The active energy level of the surface of particles becomes rather high to make it occasionally difficult to disperse particles in an aqueous medium when the number average particle diameter of fine primary particles is reduced to as small as 10 to 50 nm.

If such is the case, the dispersibility of fine particles in water can be improved by treating the surface of organic pigment powder whose number average particle diameter of primary particles has been reduced to 10 to 50 nm in the above described process with plasma to make them hydrophilic. Aqueous ink according to the invention can be obtained without using any polymer dispersant and surfactant by using organic pigment powder that has been made hydrophilic. Then, particularly, it is possible to obtain ink in which the volume average particle diameter is between 20 and 70 nm and the particle diameter distribution range is between 10 and 300 nm. Additionally, ink in which the pigment particles are treated with plasma and made to be hydrophilic hardly contains impurities such as reaction byproducts and unreacted substances so that the pigment particles in the ink are highly pure if compared with ink in which one or more than one hydrophilic groups are introduced in a liquid phase reaction system. In other words, the quality of such hydrophilic organic pigment powder and hence that of ink containing such organic pigment powder can be very high.

The above described plasma treatment is conducted by using reactive gas such as $H_2$, $O_2$, $N_2$, CO, $CO_2$ or $H_2O$ or a mixture gas of any of the above reactive gases and an inert gas such as He or Ar. Plasma treatment methods effective for treating organic pigment particles are described, for example, in "Utilization of Cold Oxygen Plasma Treatment" (T. Ihara, Coloring Materials, 54, 531, 1981), "Treatment Using Ammonium Plasma" (S. Ikeda, J. Coat. Technol., 60, 765, 107, 1988) and Japanese Patent Application Laid-open No. 11-333288. While organic pigment particles can be treated with any of these known methods, a process of micro-granulation using a vapor phase method and a plasma treatment process for introducing one or more than one hydrophilic groups are preferably conducted successively for the purpose of the present invention. The expression "conducted successively" means that the organic pigment powder obtained by means of a vapor phase method is treated with plasma without being exposed to the atmosphere (oxygen).

For the purpose of the present invention, the use of organic pigment powder into which carboxyl group is introduced by plasma treatment is particularly advantageous because such organic pigment powder is highly hydrophilic and images formed by using it are water-resistant at the same time.

Aqueous Medium

The aqueous medium to be used for the purpose of the present invention is preferably a mixture of water and an aqueous organic solvent. The water content of ink according to the invention is normally between 20 and 90 wt %, preferably between 30 and 70 wt %.

Water-soluble organic solvents that can be mixed with water for the purpose of the present invention may be classified into the following three groups. Solvents of the first group are highly moisture-retaining, less evaporative and highly hydrophilic. Those of the second group show organic properties to some extent, are capable of wetting hydrophobic surfaces and are more evaporative to easily dry the pigment. Those of the third group are moderately wetting and show lower viscosity. For the purpose of the present invention, any of those solvents may be appropriately used depending on the application of the ink.

Solvents of the first group include ethylene glycol, diethylene glycol, triethylene glycol, tripropylene glycol, glycerol, 1,2,4-butanetriol, 1,2,6-hexanetriol, 1,2,5-pentanetriol, 1,2-butanediol, 1,3-butanediol, 1,4-butanediol, dimethylsulfoxide, diacetone alcohol, glycerol monoaryl ether, propylene glycol, butylene glycol, polyethylene glycol 300, thiodiglycol, N-methyl-2-pyrrolidone, 2-pyrrolidone, γ-butylolactone, 1,3-dimethyl-2-imidazolidinone, sulfolane, trimethylolpropane, trimethylolethane, neopentyl glycol, ethylene glycol monomethyl ether, ethylene glycol monoethyl ether, ethylene glycol monoisopropyl ether, ethylene glycol monoaryl ether, diethylene glycol monomethyl ether, diethylene glycol monoethyl ether, triethylene glycol monomethyl ether, triethylene glycol monoethyl ether, propylene glycol monomethyl ether, propylene glycol monoethyl ether, dipropylene glycol monomethyl ether, dipropylene glycol monoethyl ether, β-dihydroxyethylurea, urea, acetonylacetone, pentaerythritol, 1,4-cyclohexanediol and urea derivatives.

Solvents of the second group include hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monomethyl ether, propylene glycol monoethyl ether, propylene glycol monopropyl ether, dipropylene glycol monobutyl ether, tripropylene glycol monomethyl ether, glycerol monoacetate, glycerol diacetate, glycerol triacetate, ethylene glycol monomethyl ether acetate, dipropylene glycol monomethyl ether acetate, cyclohexanol, 1,2-cyclohexanediol, 1-butanol, 3-methyl-1,5-pentanediol, 3-hexene-2,5-diol, 2,3-butanediol, 1,5-pentanediol, 2,4-pentanediol and 2,5-hexanediol.

Solvent of the third group include ethanol, n-propanol, 2-propanol, 1-methoxy-2-propanol, furfuryl alcohol and tetrahydrofurfuryl alcohol.

For the purpose of the invention, any of the above listed water-soluble organic solvents is used preferably at a rate of about 5 to 40 wt % relative to the total ink weight. Of the above listed water-soluble organic solvents, glycerol, trimethylolpropane, urea, urea derivatives and mixtures of any of these solvents are preferable for the purpose of the present invention.

Beside the above ingredients, if necessary, a surfactant, a pH regulator and/or an antiseptic may be added to aqueous ink according to the invention.

Apparatus adapted to apply thermal energy to the ink in the ink chamber of the recording head as a function of the recording signal given to the apparatus and produce ink droplets by means of the thermal energy are suitably be used for recording images by means of ink according to the invention. Such an apparatus will be described in greater detail below.

Figure 2:
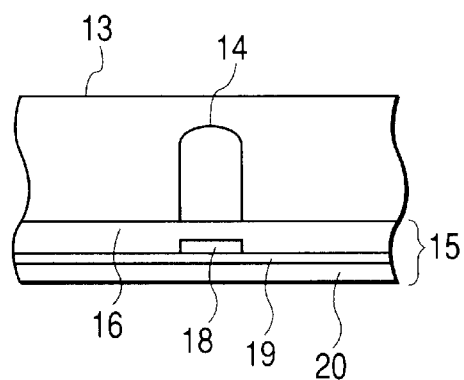
FIG. 2 is a schematic cross sectional view taken along line 2—2 in FIG. 1.
Figure 3:
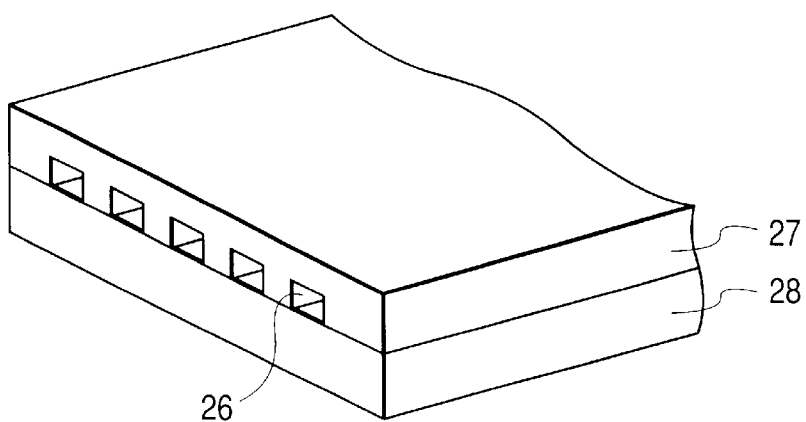
FIG. 3 is a schematic perspective view of a multi-head obtained by arranging a number of recording heads having a configuration as shown in FIG. 1.

FIGS. 1, 2 and 3 schematically illustrate the recording head of such an apparatus. It may be needless to say that the recording head is a principal component of the apparatus. Referring to FIGS. 1, 2 and 3, the head 13 is prepared by bonding a plate of glass, ceramic or plastic and a thermal head base 15 (which is not limited to the illustrated one) to be used for thermal recording. The thermal head base 15 has a protection film 16 typically made of silicon oxide, a pair of aluminum electrodes 17-1 and 17-2, a heat generating resistor layer 18 typically made of nichrome, a heat storage layer 19 and a substrate 20 typically made of alumina and adapted to emit heat.

Ink 21 is made to get to ejection orifice (micro-hole) 22 and form a meniscus 23 under pressure P.

As an electric signal is applied to the electrodes 17-1 and 17-2, the thermal head 15 abruptly generates heat from a region indicated by n so that the part of the ink 21 that is held in contact with the region produces a bubble to push forward the meniscus under pressure and eventually eject ink 21 from the orifice 22 as fine recording ink droplets 24, which are ejected toward the recording medium 25. FIG. 3 is a schematic perspective view of a multi-head prepared by arranging a number of heads having a configuration as shown in FIG. 1. Referring to FIG. 3, the multi-head is prepared by tightly bonding a glass plate 27 having multiple grooves 26 and a base plate having the corresponding thermal head bases as described above by referring to FIG. 1. Note that FIG. 1 shows a cross sectional view taken along the ink flow path of the head and FIG. 2 is a cross sectional view taken along line 2—2 in FIG. 1.

Figure 4:
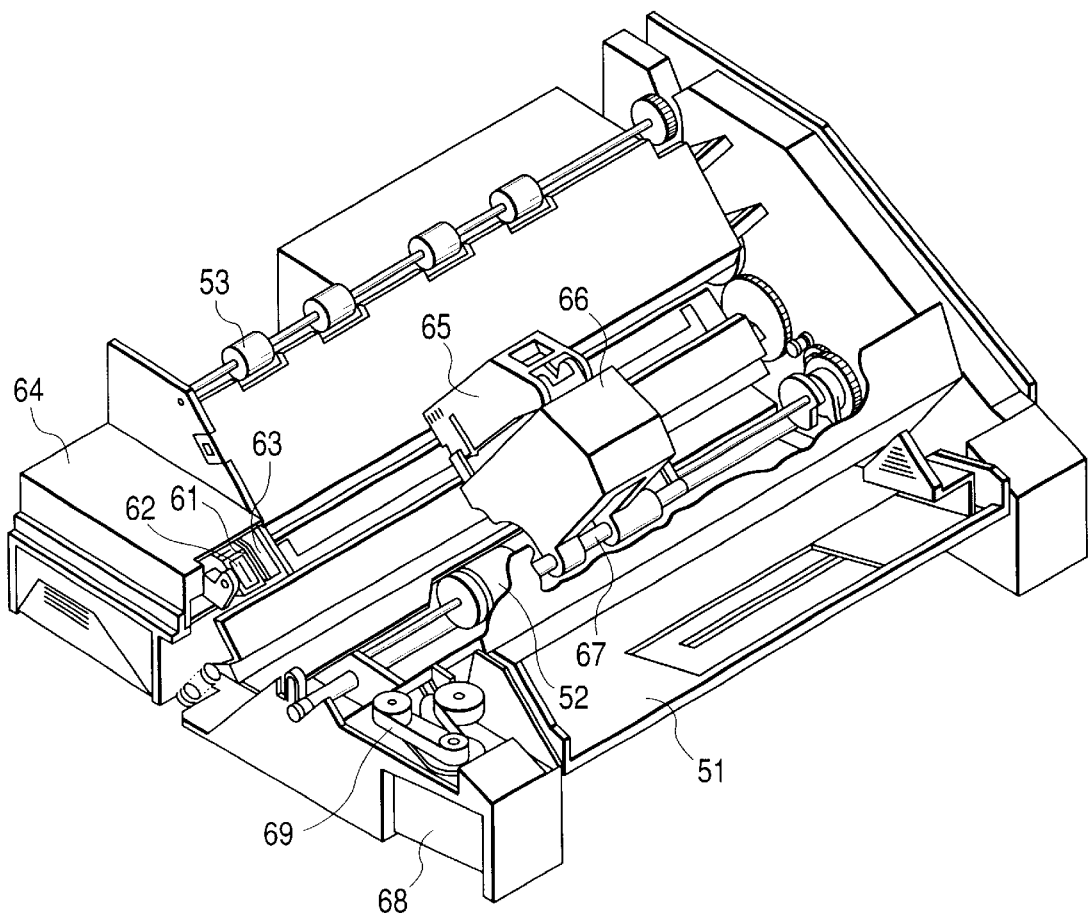
FIG. 4 is a schematic perspective view of an ink-jet recording apparatus realized by using a multi-head as shown in FIG. 3.

FIG. 4 is a schematic perspective view of an ink-jet recording apparatus realized by using a multi-head as shown in FIG. 3. In FIG. 4, reference symbol 61 denotes a blade operating as a wiping member, which is rigidly held at an end to a blade holding member so that it operates like a cantilever. The blade 61 is arranged adjacent to the recording region of the recording head and, in this embodiment, held in position in such a way that it partly projects onto the moving path of the recording head. In FIG. 4, reference symbol 62 denotes a cap located at home position that is adjacent to the blade 61. It is adapted to move in a direction perpendicular to the moving direction of the recording head and abut the ejection orifices to cap the head. In FIG. 4, reference symbol 63 denotes an absorbent body that is also held in position in such a way that it partly projects onto the moving path of the recording head. The blade 61, the cap 62 and the absorbent body 63 form a head restoring section 64. The blade 61 and the absorbent body 63 clear moisture and dust from the ink ejection orifices.

In FIG. 4, reference symbol 65 denotes a recording head adapted to eject ink from the ejection orifices toward a recording medium that is arranged vis-a-vis the ejection orifices and reference symbol 66 denotes a carriage that moves and carries the recording head 65 with it. Although not shown, the carriage 66 is linked to belt 69 that is driven to rotate by a motor 68. Therefore, the carriage 66 can be moved along its guide shaft 67 to move the recording head 65 in the recording region and adjacent regions.

In FIG. 4, reference symbol 51 denotes a sheet feeding section for receiving a sheet of recording paper and reference symbol 52 denotes a feed roller that is driven to revolve by a motor (not shown). After a sheet of recording paper is fed to a position located vis-a-vis the ejection orifices of the recording head, a recording operation starts and the sheet is gradually delivered to a sheet discharge section provided with sheet discharge rollers 53 as the recording operation proceeds.

When the recording head 65 returns to its home position after the end of a recording session, the cap 62 of the head restoring section 64 is kept to retract from the moving path of the recording head 65 but the blade 61 remains on the moving path. As a result, the ejection orifices of the recording head 65 are wiped and cleaned. When the cap 62 is made to come to abut the ejection orifices of the recording head 65 to cap the latter, it is made to project onto the moving path of the recording head.

When the recording head 65 is driven to start moving from its home position to the recording start position, both the absorbent body 63 and the blade 61 are located at the respective positions for wiping operation. Therefore, the ejection orifices of the recording head 65 are also wiped and cleaned as a result of this movement.

The above described movement of the recording head to the home position is not limited to the end of a recording session and the time for restoring the ink ejection. The recording head is so designed that it returns to the home position located adjacent to the recording region at regular time intervals while the recording head is driven to move in the recording region for a recording session and, each time the recording head moves to and from the home position, it operates for wiping and cleaning the ejection orifices.

Figure 5:
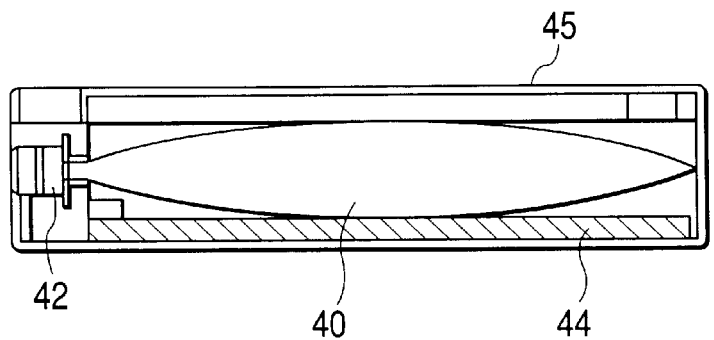
FIG. 5 is a schematic cross sectional view of an ink cartridge adapted to supply ink to a multi-head as shown in FIG. 3.

FIG. 5 is a schematic cross sectional view of an ink cartridge containing ink and adapted to supply ink to a recording head. Ink is supplied from the ink cartridge to the recording head typically by way of a tube. In FIG. 5, reference symbol 40 denotes an ink container containing ink to be supplied, which may typically be a sort of bag provided at the front end thereof with a rubber peg 42. Ink comes out from the bag 40 and is supplied to the recording head as a needle (not shown) is driven to pierce the peg 42. Reference symbol 44 denotes an absorbent body for receiving waste ink. The surface of the ink container that is held in contact with ink is formed by polyolefin, preferably by polyethylene.

Figure 6:
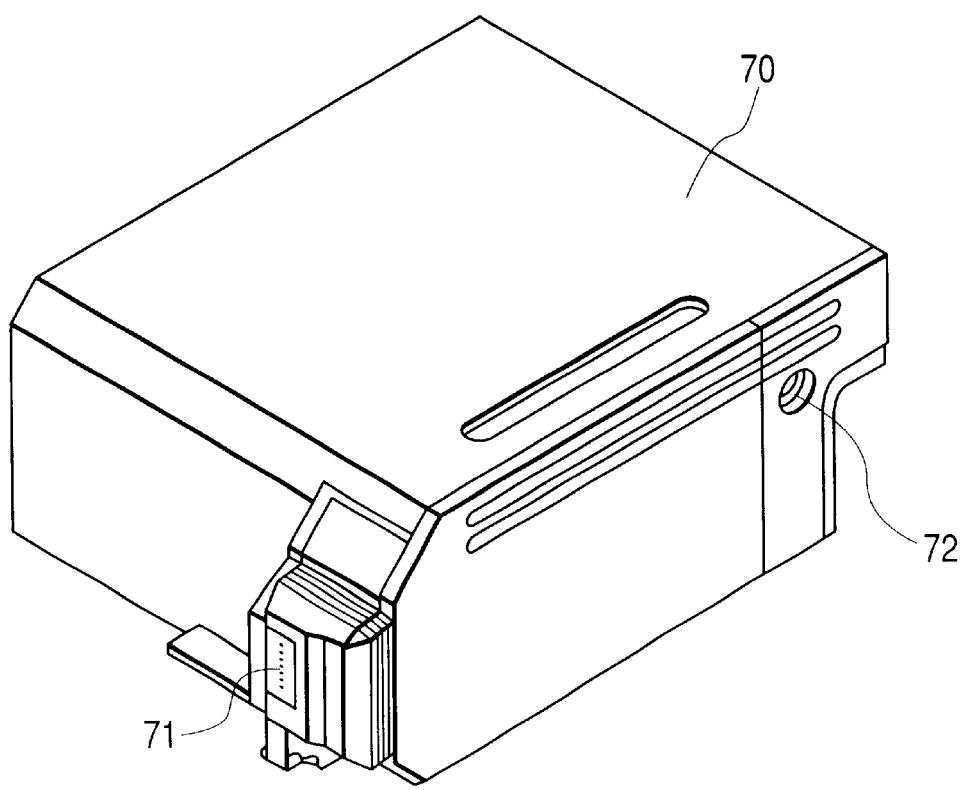
FIG. 6 is a schematic perspective view of a recording unit comprising a multi-head as shown in FIG. 3 and an ink cartridge as shown in FIG. 5 as integral parts thereof.

Ink-jet recording apparatus that can be used with ink according to the invention are not limited to those where the head and the ink cartridge are separated from each other as described above and those where the head and the ink cartridge are integrally combined as shown in FIG. 6 may also be used with ink according to the invention.

Referring to FIG. 6 that illustrates a recording unit comprising a multi-head and an ink cartridge as integral parts thereof, reference symbol 70 generally denotes the recording unit. The recording unit has in the inside thereof an ink container which may be an ink absorbent body, from which ink is supplied to head section 71 comprising a plurality of ejection orifices and ejected as ink droplets. For the purpose of the present invention, the ink absorbent body is preferably made of polyurethane. In FIG. 6, reference symbol 72 denotes an air hole through which the inside of the recording unit communicates with the atmosphere. The recording unit 70 may replace the recording head in FIG. 4. It is removably fitted to the carriage 66.

EXAMPLE 1

C.I. Pigment Yellow 147 that is an anthraquinone type pigment is placed at an evaporation source arranged in a vacuum vessel and He is introduced into the vessel as inert gas so that the inner pressure of the vacuum vessel is maintained at 0.7 Torr. Then, the pigment placed at the evaporation source is heated and evaporated by means of a laser. Produced fine particles of the pigment are subsequently deposited to adhere to a rotary substrate arranged over the evaporation source. Thereafter, the deposited fine particles of the pigment are transported by rotating the substrate to a discharge plasma region that is held stably in a discharging state in advance. The fine particles of the pigment produced in this way were observed through a scanning electron microscope to find that the number average particle diameter of primary particles was 35 nm. Since $O_2$ gas has been introduced near the discharge electrode of the discharge plasma region, plasma is being generated in an $O_2$ gas atmosphere. Hence, the fine particles of the pigment that have been deposited to adhere to the rotary substrate are made to pass through the region to introduce a hydrophilic group into the surface of the fine pigment particles. The fine particles of the pigment treated by oxygen plasma on the rotary substrate are scraped off from the latter by means of a blade and collected in a predetermined container.

The infrared absorption spectrum of the collected fine particles of the pigment was observed to find that carboxyl group had been introduced as a hydrophilic group.

The collected fine particles of the pigment were dispersed in water and the inorganic impurities contained therein were observed by means of an SPS plasma emission spectrophotometric analyzer (available from Seiko Electronics) to find that the silicon concentration was not greater than 10 ppm and the total concentration of polyvalent metals including Ca, Fe, Mg, Zn and P was not greater than 10 ppm to make the total concentration of silicon and polyvalent metals not greater than 20 ppm.

The particle diameter distribution of the fine particles of the pigment in an aqueous dispersion was observed by means of an electrophoretic light scattering photometer ELS800 (tradename: available from Otsuka Electronics) to find that the volume average particle diameter was 48.5 nm and the particle diameter distribution was in a range between 10 and 200 nm.

Then, aqueous ink containing the organic pigment to about 3.5% was prepared by dispersing fine particles of the organic pigment in water and mixing the water with an aqueous liquid medium containing at least glycerol as wetting agent.

The aqueous ink was filled in a BJF850 printer (tradename: available from Canon) and the printer was operated continuously for a long period of time to see the influence of the ink on the ink ejection performance of the recording head. No problematic phenomenon appeared and the printer operated well for the expected entire service life.

Additionally, the saturation of the images printed on glossy mediums to be used for ink-jet recording, that is Photo Glossy Film HG-201 and Professional Photo Paper PR-101 (both are available from Canon), and the transparency of the images printed on OHP film, that is CF-102 for color BJ (available from Canon), were evaluated. As a result, it was found that ink according to the invention provides a significant improvement in terms of both saturation and transparency if compared with known ink typically showing a volume average particle diameter of about 100 nm and a particle diameter distribution range between 20 and 600 nm.

Comparative Example

The procedure of the above example was followed except that ink prepared by using azo-type C.I. Pigment Yellow 74 was used in place of anthraquinone-type C.I. Pigment Yellow 147 of the ink of the above example.

When C.I. Pigment Yellow 74 having an azo-type structure was used, the pigment itself was thermally decomposed in the process where the pigment is heated and evaporated. Therefore, it was not possible to collect pigment particles having the same molecular structure.

As described above, it is possible to obtain color images whose saturation and transparency are comparable to those of dye ink can be obtained by using aqueous ink containing pigment as coloring material according to the invention. The present invention also provides organic pigment powder that is excellent in terms of color tone and stability. Furthermore, according to the invention, it is possible to provide ink whose quality is made more uniform than ever because the concentration of inorganic impurities attributable to the organic pigment contained in the ink can be reduced.

What is claimed is:

1. An aqueous ink comprising an organic pigment micro-granulated by means of a vapor phase method, the pigment containing anthraquinone as principal ingredient, wherein the organic pigment has a number average particle diameter of primary particles of 10 to 50 nm.

2. An aqueous ink according to claim 1, wherein said organic pigment has a hydrophilic group introduced by means of a plasma treatment.

3. An aqueous ink according to claim 2, wherein the hydrophilic group is carboxyl group.

4. An aqueous ink according to claim 2, wherein said organic pigment is obtained by successively conducting the process of micro-granulation of the organic pigment by means of a vapor phase method and a process of introducing a hydrophilic group into the micro-granulated organic pigment by means of a plasma treatment.

5. An aqueous ink according to claim 1, wherein said organic pigment in the ink has a volume average particle diameter of 20 to 70 nm and a particle diameter distribution range of 10 to 300 nm.

6. An aqueous ink according to claim 1, wherein said organic pigment is selected from the group consisting of C.I. Pigment Yellow 23, 108, 147 and 199.

7. An aqueous ink according to claim 1, wherein the total concentration of polyvalent metals and silicon in the organic pigment is not higher than 20 ppm.

8. An aqueous ink according to claim 1, wherein the aqueous ink is to be used for ink-jet recording.

9. An aqueous ink according to claim 8, wherein the ink-jet recording comprises a step of applying thermal energy to ink to eject the ink.

10. A recording unit comprising:
an ink container containing an aqueous ink according to claim 8 and an ink-jet recording head for ejecting the ink.

11. An ink-jet recording apparatus comprising:
an ink container containing an aqueous ink according to claim 8 and an ink-jet recording head for ejecting the ink.

12. An ink cartridge containing an aqueous ink according to claim 1.

13. Organic pigment powder containing anthraquinone as principal ingredient, the powder being micro-granulated by means of a vapor phase method, wherein said organic pigment powder has a number average particle diameter of primary particles of 10 to 50 nm and has a hydrophilic group introduced by means of a plasma treatment.

14. Organic pigment powder according to claim 13, wherein the hydrophilic group is carboxyl group.

15. Organic pigment powder according to claim 13, wherein said organic pigment is selected from the group consisting of C.I. Pigment Yellow 23, 108, 147 and 199.

16. Organic pigment powder according to claim 13, wherein the total concentration of polyvalent metals and silicon in the organic pigment powder is not higher than 20 ppm.

17. Organic pigment powder according to claim 13, having been successively subjected to a vapor phase method for micro-granulation of the organic pigment, and a plasma treatment for introduction of a hydrophilic group to the micro-granulated pigment.

* * * * *